US011878828B2

(12) United States Patent
Mattioli et al.

(10) Patent No.: US 11,878,828 B2
(45) Date of Patent: Jan. 23, 2024

(54) OUTFEED DEVICE FOR A PACKAGING ASSEMBLY AND PACKAGING ASSEMBLY COMPRISING AN OUTFEED DEVICE

(71) Applicant: TETRA LAVAL HOLDINGS & FINANCE S.A., Pully (CH)

(72) Inventors: Giorgio Mattioli, Modena (IT); Massimiliano Barbi, Castelfranco Emilia (IT); Dino Neri, Modena (IT); Massimo Fratti, Modena (IT); Richard John Pedretti, Formigine (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 1 day.

(21) Appl. No.: 17/052,229

(22) PCT Filed: May 3, 2019

(86) PCT No.: PCT/EP2019/061428
§ 371 (c)(1),
(2) Date: Nov. 2, 2020

(87) PCT Pub. No.: WO2019/215048
PCT Pub. Date: Nov. 14, 2019

(65) Prior Publication Data
US 2021/0380300 A1     Dec. 9, 2021

(30) Foreign Application Priority Data
May 11, 2018   (EP) ..................................... 18171760

(51) Int. Cl.
*B65B 61/28*     (2006.01)
*B65B 35/16*     (2006.01)
(Continued)

(52) U.S. Cl.
CPC .............. *B65B 61/28* (2013.01); *B65B 35/16* (2013.01); *B65B 35/56* (2013.01); *B65G 47/244* (2013.01); *B65G 47/841* (2013.01)

(58) Field of Classification Search
CPC ......... B65B 61/28; B65B 35/16; B65B 35/56; B65B 21/00–26; B65G 47/244; B65G 47/841; B65G 17/00–485
See application file for complete search history.

(56) References Cited

U.S. PATENT DOCUMENTS 3,771,648 A * 11/1973 Revuelta ............... B65G 47/845
                                                                198/364
3,857,223 A * 12/1974 Dominici ................ B65B 61/24
                                                                53/526
(Continued)

FOREIGN PATENT DOCUMENTS

CN     210311220 U    4/2020
EP     2586719 A1     5/2013
(Continued)

OTHER PUBLICATIONS

International Search Report (PCT/ISA/210) dated Jul. 29, 2019, by the European Patent Office as the International Searching Authority for International Application No. PCT/EP2019/061428.
(Continued)

*Primary Examiner* — Thomas M Wittenschlaeger
*Assistant Examiner* — Katie L Gerth
(74) *Attorney, Agent, or Firm* — BUCHANAN INGERSOLL & ROONEY PC

(57) ABSTRACT

There is described an outfeed device for a packaging assembly configured to form and seal a plurality of packages containing a pourable product; the outfeed device comprises an input station, at which it receives, in use, the packages, and an output station, at which the packages exit, in use, from the outfeed device; the outfeed device comprises at
(Continued)

least one selectively operable cart element cyclically movable along an endless path, comprising a receiving portion defining a receiving seat for picking one single package at a time at input station, housing at least part of the package, and being configured to bring the package from the input station to the output station.

21 Claims, 7 Drawing Sheets

(51) Int. Cl.
*B65B 35/56* (2006.01)
*B65G 47/244* (2006.01)
*B65G 47/84* (2006.01)

(56) References Cited

U.S. PATENT DOCUMENTS

| | | | | |
|---|---|---|---|---|
| 4,055,943 A * | 11/1977 | Reichert | ............... | B65B 21/183 53/247 |
| 4,169,621 A * | 10/1979 | McGill | ................ | B65G 47/90 294/116 |
| 4,462,202 A * | 7/1984 | Reil | ............... | B65B 61/24 53/526 |
| 4,640,406 A * | 2/1987 | Willison | ................ | B41F 17/14 198/470.1 |
| 5,036,644 A * | 8/1991 | Lashyro | ................ | B65B 21/242 53/448 |
| 5,261,520 A * | 11/1993 | Duke | ................ | B65G 47/244 198/377.07 |
| 5,588,282 A * | 12/1996 | Hartness | ............... | B65B 21/183 53/251 |
| 6,170,650 B1 * | 1/2001 | Morikiyo | ............... | B62D 65/00 198/465.1 |
| 6,360,673 B1 * | 3/2002 | Herrin | ................ | B65G 47/962 104/118 |
| 7,036,658 B2 * | 5/2006 | Hartness | ............... | B65G 17/323 198/803.7 |
| 8,161,713 B2 * | 4/2012 | Skarin | ................ | B65B 61/186 53/133.2 |
| 8,920,297 B2 * | 12/2014 | Maccagnani | ......... | B65B 61/186 53/331.5 |
| 9,187,199 B2 * | 11/2015 | Maccagnani | ......... | B65B 61/186 |
| 9,403,611 B2 * | 8/2016 | Sacchetti | ............. | B65G 47/842 |
| 9,409,368 B2 * | 8/2016 | Catellani | ................ | B65B 61/24 |
| 9,637,262 B2 * | 5/2017 | Pedretti | ................... | B65B 49/02 |
| 9,878,815 B2 * | 1/2018 | Zuccotti | ............... | B65B 61/186 |
| 9,902,566 B2 * | 2/2018 | Pedretti | ................. | B65B 11/00 |
| 9,956,721 B2 * | 5/2018 | Abt | ................... | B29C 65/7802 |
| 10,029,814 B2 * | 7/2018 | Galata' | ..................... | B65B 7/20 |
| 10,071,534 B2 * | 9/2018 | Pradelli | .................. | B31B 50/52 |
| 10,093,484 B2 * | 10/2018 | Mattioli | ................. | B65B 51/10 |
| 10,106,280 B2 * | 10/2018 | Morselli | ............... | B65B 35/405 |
| 10,189,655 B2 * | 1/2019 | Pradelli | ................... | B65G 35/00 |
| 10,195,790 B2 * | 2/2019 | Fontanazzi | ......... | B29C 66/73921 |
| 2001/0029721 A1 * | 10/2001 | Sato | ....................... | B65B 61/24 53/376.4 |
| 2004/0112714 A1 * | 6/2004 | Davaillon | ............ | B65G 47/082 198/470.1 |
| 2005/0173438 A1 * | 8/2005 | Berggren | .............. | B65B 61/186 220/278 |
| 2008/0044510 A1 * | 2/2008 | Doudement | ......... | B65G 17/323 425/522 |
| 2009/0025337 A1 * | 1/2009 | Skarin | ..................... | B31B 50/84 53/133.1 |
| 2009/0200136 A1 * | 8/2009 | Giehrl | .................... | B65G 17/44 198/341.01 |
| 2010/0140052 A1 * | 6/2010 | Martini | ................. | B65G 47/082 198/419.2 |
| 2011/0173931 A1 * | 7/2011 | Ford | ......................... | B65B 5/04 53/473 |
| 2011/0203225 A1 * | 8/2011 | Maccagnani | ......... | B65B 61/186 53/285 |
| 2013/0192956 A1 * | 8/2013 | Lahogue | ................ | B65G 23/30 198/478.1 |
| 2014/0194267 A1 * | 7/2014 | Pradelli | .................. | B65B 49/04 493/243 |
| 2014/0196417 A1 * | 7/2014 | Galata' | .................... | B65B 61/24 53/551 |
| 2014/0223858 A1 * | 8/2014 | Pedretti | ................... | B65B 35/58 198/377.02 |
| 2014/0371046 A1 * | 12/2014 | Catellani | ................ | B31B 50/02 493/162 |
| 2017/0050379 A1 * | 2/2017 | Houben | ................ | B29C 64/232 |
| 2017/0095962 A1 * | 4/2017 | Zoppas | ................ | B65G 17/323 |
| 2017/0283183 A1 * | 10/2017 | Erceg | ..................... | B65G 43/02 |
| 2018/0116229 A1 * | 5/2018 | Fukugami | .............. | A21C 9/085 |
| 2019/0129371 A1 * | 5/2019 | Wagner | ................ | B65G 1/0492 |
| 2019/0210280 A1 * | 7/2019 | Houben | .................... | B22F 3/24 |
| 2023/0080709 A1 * | 3/2023 | Gabrieli | ............... | B65G 47/962 |

FOREIGN PATENT DOCUMENTS

| | | |
|---|---|---|
| JP | 2015-501269 A | 1/2015 |
| WO | 2008022296 A2 | 2/2008 |
| WO | 2019/215048 A1 | 11/2019 |

OTHER PUBLICATIONS

Written Opinion (PCT/ISA/237) dated Jul. 29, 2019, by the European Patent Office as the International Searching Authority for International Application No. PCT/EP2019/061428.

* cited by examiner

OUTFEED DEVICE FOR A PACKAGING ASSEMBLY AND PACKAGING ASSEMBLY COMPRISING AN OUTFEED DEVICE

TECHNICAL FIELD

The present invention relates to an outfeed device for a packaging assembly configured to form and seal a plurality of packages containing a pourable product, in particular a pourable food product.

The present invention also relates to a packaging assembly configured to form and seal a plurality of packages containing a pourable product, in particular a pourable food product, and comprising an outfeed device.

BACKGROUND ART

As it is generally known, many pourable food products, such as fruit juice, UHT (ultra-high temperature-treated) milk, wine, tomato sauce, etc., are sold in packages made of sterilized packaging material.

A typical example is the parallelepiped-shaped package for pourable food products known as Tetra Brik Aseptic (registered trademark), which is made by folding and sealing a laminated web of packaging material.

Such packages are normally produced on fully automatic packaging assemblies, in which a continuous tube is formed from a web of packaging material.

In particular, the web is folded and sealed longitudinally to form the tube, and then the tube is fed along a vertical direction.

In order to complete the forming operations, the tube is filled from above, by means of a pipe, with the pourable food product and is formed, sealed and subsequently cut along equally spaced transversal cross sections.

Pillow packs are obtained thereby, which have a longitudinal sealing band, a top transversal sealing band and a bottom transversal sealing band.

More specifically, each pillow pack usually comprises a prismatic main portion, having a longitudinal axis, and a top end portion and a bottom end portion opposite to each other. In detail, the top end portion and the bottom end portion define respective transitions from the main portion towards the top sealing band and the bottom sealing band, respectively.

Each pillow pack also comprises two pairs of substantially triangular flaps projecting from opposite sides of the respective top end portion or bottom end portion.

After being formed, sealed and cut, the pillow packs are typically fed to a folding unit configured to perform a final folding operation on the pillow packs, so as to obtain respective finished packages.

In particular, the folding unit comprises an endless conveyor configured to advance the pillow packs along a folding path, from a supply station to a release station. The folding path typically comprises a top straight branch, a bottom straight branch and two opposite curved branches connecting the top straight branch and the bottom straight branch.

Generally, the supply station is arranged at one of the curved branches and the release station is arranged at the bottom straight branch.

Along the folding path, the top end portion and the bottom end portion of each pillow pack are pressed towards each other to form a top end wall and a bottom end wall opposite to each other; at the same time, the triangular flaps of the top end portion are folded outwards onto respective lateral walls of the main portion and the triangular flaps of the bottom end portion are folded inwards onto the respective bottom end wall.

After being completely folded by the folding unit, the finished packages are fed to an outfeed device.

Outfeed devices are known, for example from EP-B-2586719, which are arranged in a position under the folding unit, so as to receive the packages exiting from the folding unit through the release station. The outfeed device substantially comprises a conveyor onto which each package is directly released under the action of gravity at an input station. Such input station corresponds to the above-mentioned release station.

More specifically, the outfeed device is configured to advance the packages along an outfeed path from the input station to an output station, at which each package exits the outfeed device.

The packaging assemblies of the above-mentioned type, along with the relative folding units and outfeed devices, usually operate at high speed.

Due to their elongated shape, the packages released under the gravity action onto the conveyor of the outfeed device may be subject to instability; moreover, the packages may be subject to friction when advancing on the conveyor of the outfeed device.

These factors can cause the packages to fall while being advanced onto the conveyor, thereby causing production jamming.

DISCLOSURE OF INVENTION

It is therefore an object of the present invention to provide an outfeed device, which is designed to overcome the above-mentioned drawback in a straightforward and low-cost manner.

This object is achieved by an outfeed device as claimed in claim 1.

It is therefore another object of the present invention to provide a packaging assembly, which is designed to overcome the above-mentioned drawback in a straightforward and low-cost manner.

This object is achieved by a packaging assembly as claimed in claim 16.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
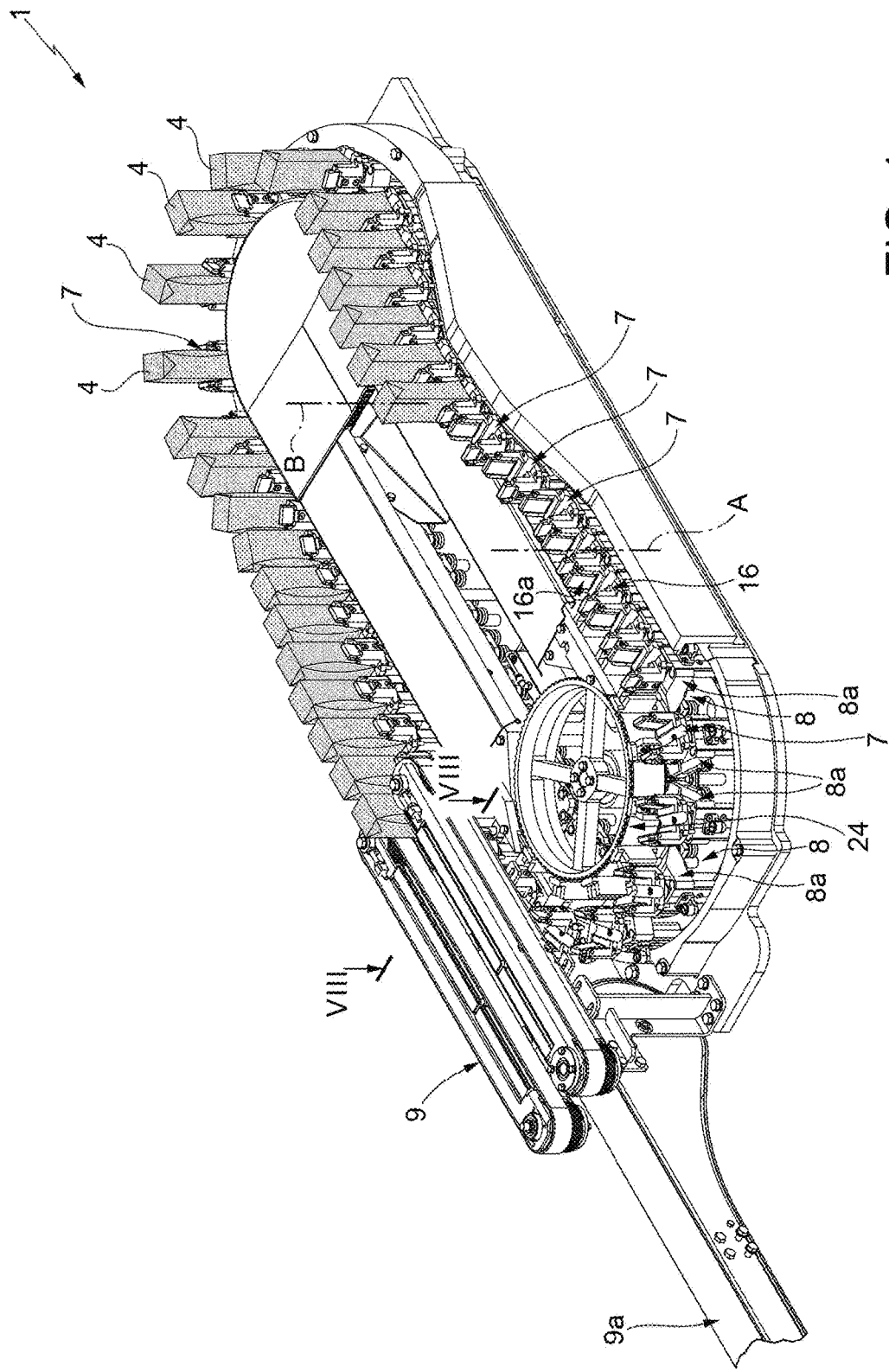
FIG. 1 is a perspective view, with parts removed for clarity, of an outfeed device according to the present invention.

With reference to FIG. 1, number 1 indicates as a whole an outfeed device for a packaging assembly (known per se and not shown) configured to form and seal a plurality of packages 4 containing a pourable product, in particular a pourable food product such as fruit juice, milk, wine, tomato sauce, etc.

In particular, packages 4 may be obtained from a tube, which is formed in a known manner upstream of outfeed device 1 by longitudinally folding and sealing a web (not shown) of packaging material.

After being formed, the tube is filled with the pourable food product and is fed to a forming unit (not shown) of the packaging assembly. In the forming unit, the tube is sealed and cut along equally spaced cross-sections to form a plurality of pillow packs 2 (schematically shown in FIG. 2), which have a longitudinal sealing band, a top transversal sealing band and bottom transversal sealing band.

More specifically, each pillow pack 2 comprises a main portion, having a longitudinal axis B and a top end portion and bottom end portion opposite to each other. In detail, the top end portion and the bottom end portion define respective transitions from the main portion towards the respective top sealing band and bottom sealing band.

Each pillow pack 2 also comprises two pairs of substantially triangular flaps projecting from opposite sides of the relative top end portion or bottom end portion.

After being formed, sealed and cut in the forming unit, such pillow packs 2 are fed to a folding unit 3 (schematically shown in FIG. 2) configured to perform, according to a known manner not described in detail, a final folding operation on pillow packs 2, so as to obtain respective finished packages 4.

In greater detail, folding unit 3 comprises an endless conveyor 3a configured to advance pillow packs 2 along a folding path F, from a supply station S to a release station D. In particular, folding path F comprises a first straight branch, a second straight branch and two opposite curved branches connecting the first straight branch and the second straight branch. Supply station S is arranged at one of the curved branches and the release station D is arranged at the second straight branch.

Along folding path F, the top end portion and the bottom end portion of each pillow pack 2 are pressed towards each other to form a top end wall 5 and a bottom end wall 5 opposite to each other and coaxial to the relative main portion; at the same time, the triangular flaps of the top end portion are folded outwards onto respective lateral walls 6 of the relative main portion and the triangular flaps of the bottom end portion are folded inwards onto the relative bottom end wall 5.

In this way, a plurality of finished packages 4 is obtained. After being completely folded by folding unit 3, packages 4 are fed to outfeed device 1.

Figure 2:
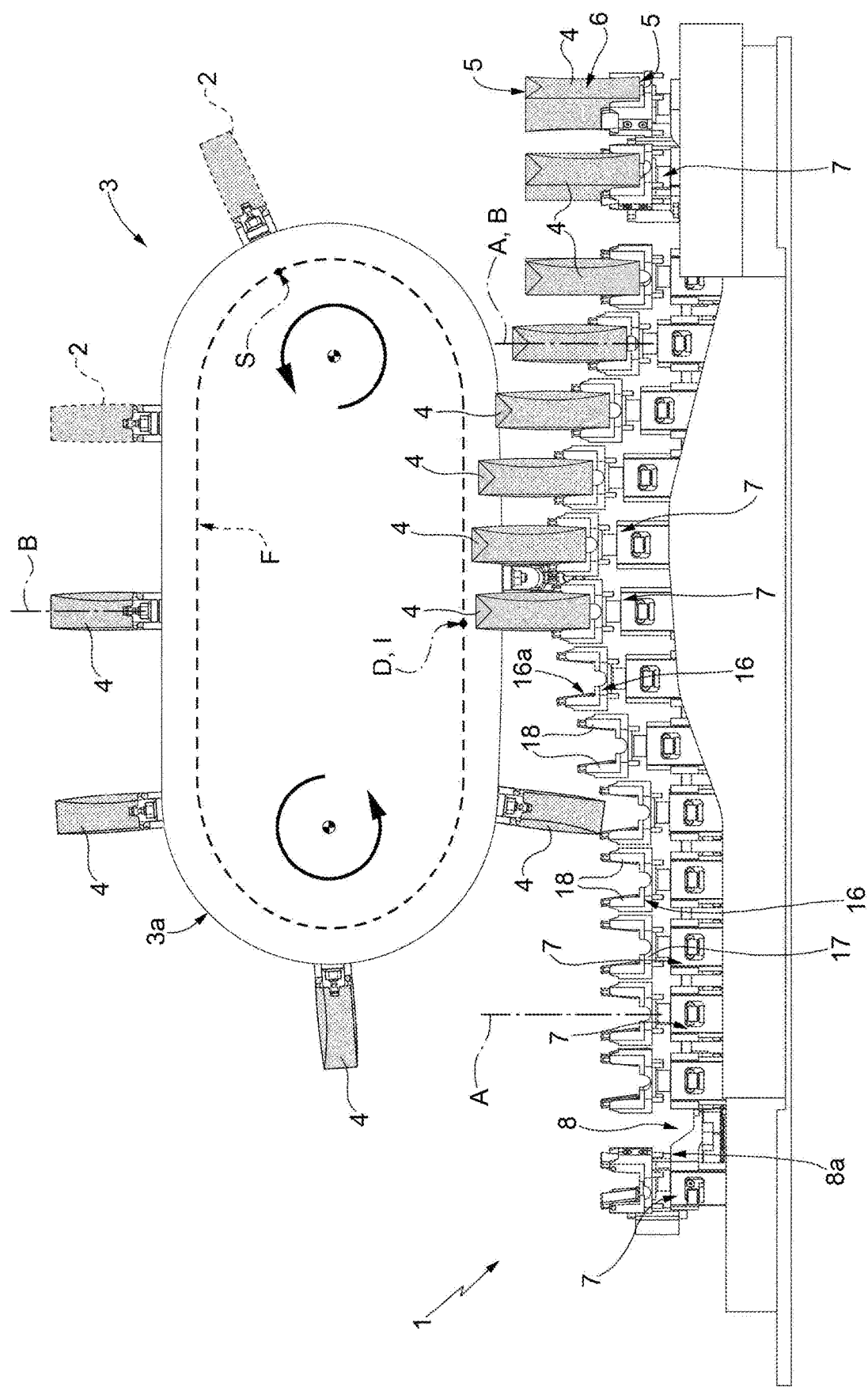
FIG. 2 is a larger-scale side view, with parts removed for clarity, of the outfeed device of FIG. 1 while cooperating with a folding unit for folding pillow packs.
Figure 3:
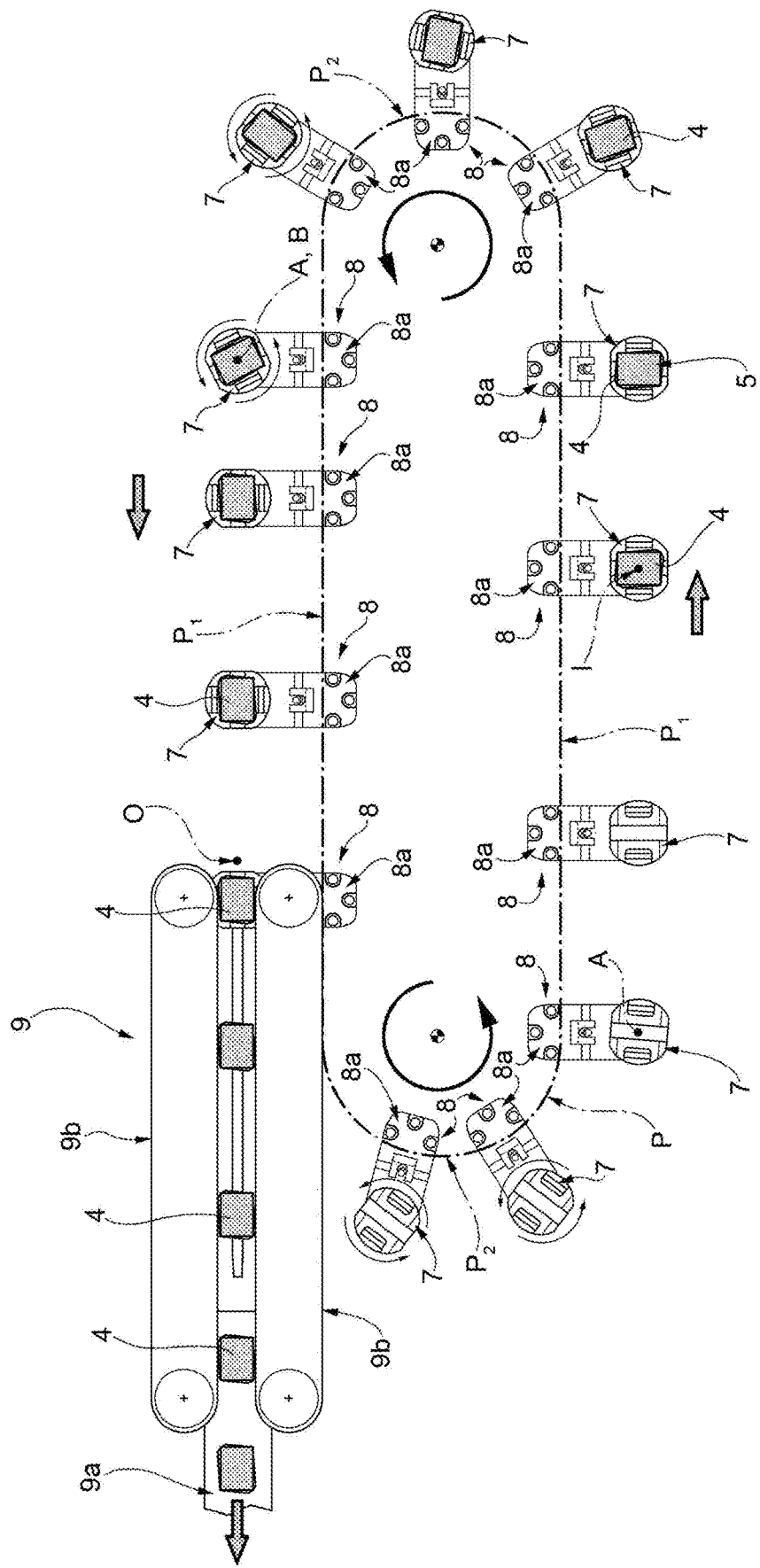
FIG. 3 is a larger-scale, schematic top view of the outfeed device of FIG. 1.
Figure 5:
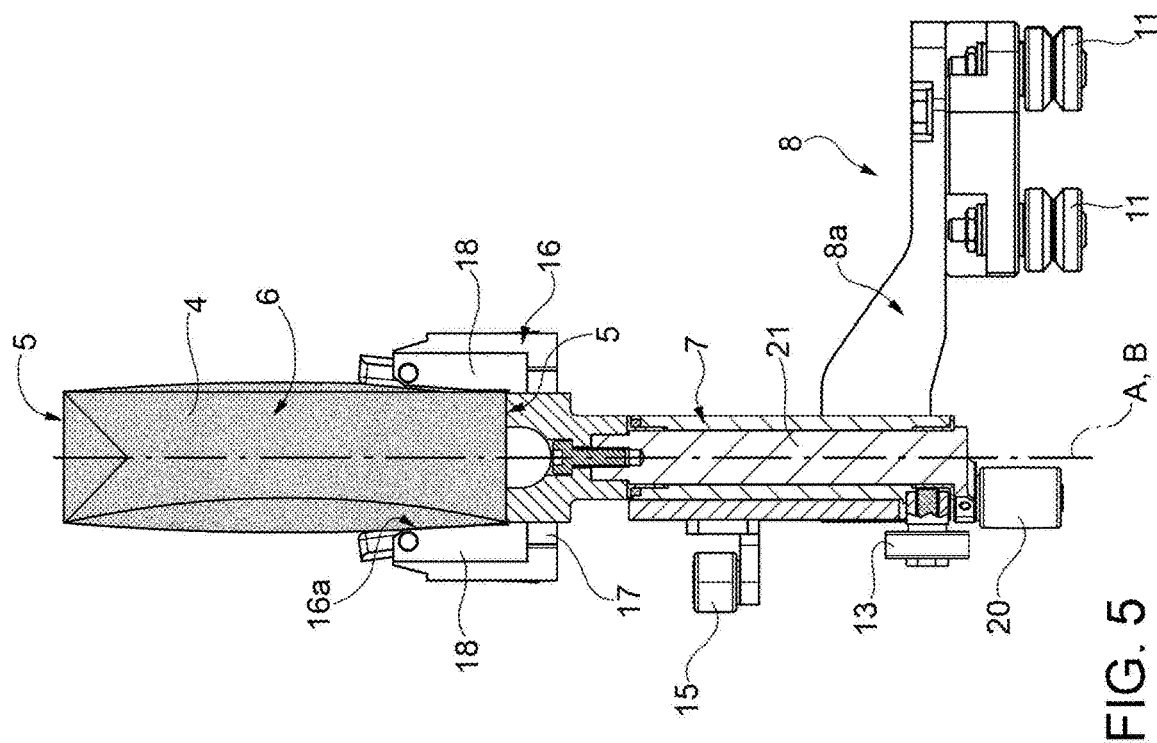
FIG. 5 is a partially sectioned side view of the component of FIG. 4.
Figure 4:
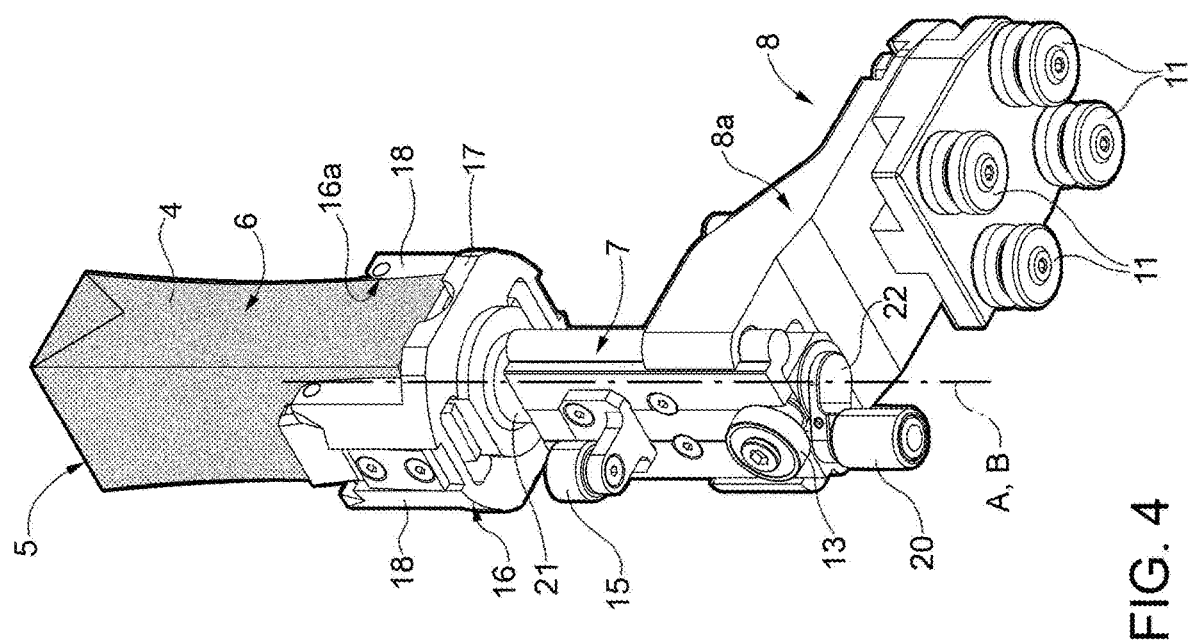
FIG. 4 is a perspective view of a component of the outfeed device of FIG. 1.

As visible in FIGS. 2 and 3, outfeed device 1 comprises:
an input station I, at which outfeed device 1 receives, in use, packages 4 from release station D of folding unit 3; and
an output station O, at which packages 4 exit, in use, from outfeed device 1 (both input station I and output station O are shown only schematically).

In particular, input station I of outfeed device 1 is located in correspondence of release station D. Preferably, outfeed device 1 is arranged in a position underneath folding unit 3 (FIG. 2).

As visible in FIGS. 1, 2 and 3, outfeed device 1 comprises a plurality of selectively operable cart elements, preferably carts 8, each one being cyclically movable along an endless path P. Each cart 8 comprises a receiving portion 16 defining a receiving seat 16a for picking one single package 4 at a time at input station I, housing at least part of such package 4, and being configured to bring the same package 4 from input station I to output station O.

According to this non-limiting preferred embodiment, path P is substantially oval-shaped, extends horizontally and comprises two opposite straight branches P1 and two opposite curved branches P2 connecting straight branches P1.

In particular, input station I is arranged in correspondence of one straight branch and output station O is arranged in correspondence of the other straight branch.

In light of the above, outfeed device 1 is configured to receive packages 4 from folding unit 3 at input station I, convey such packages towards output station O, and release them to a conveying unit, in particular a belt unit 9, arranged downstream of output station O (FIGS. 1 and 3).

In particular, belt unit 9 is configured to convey packages 4 from output station O and feed them onto an outlet conveyor 9a.

Figure 8:
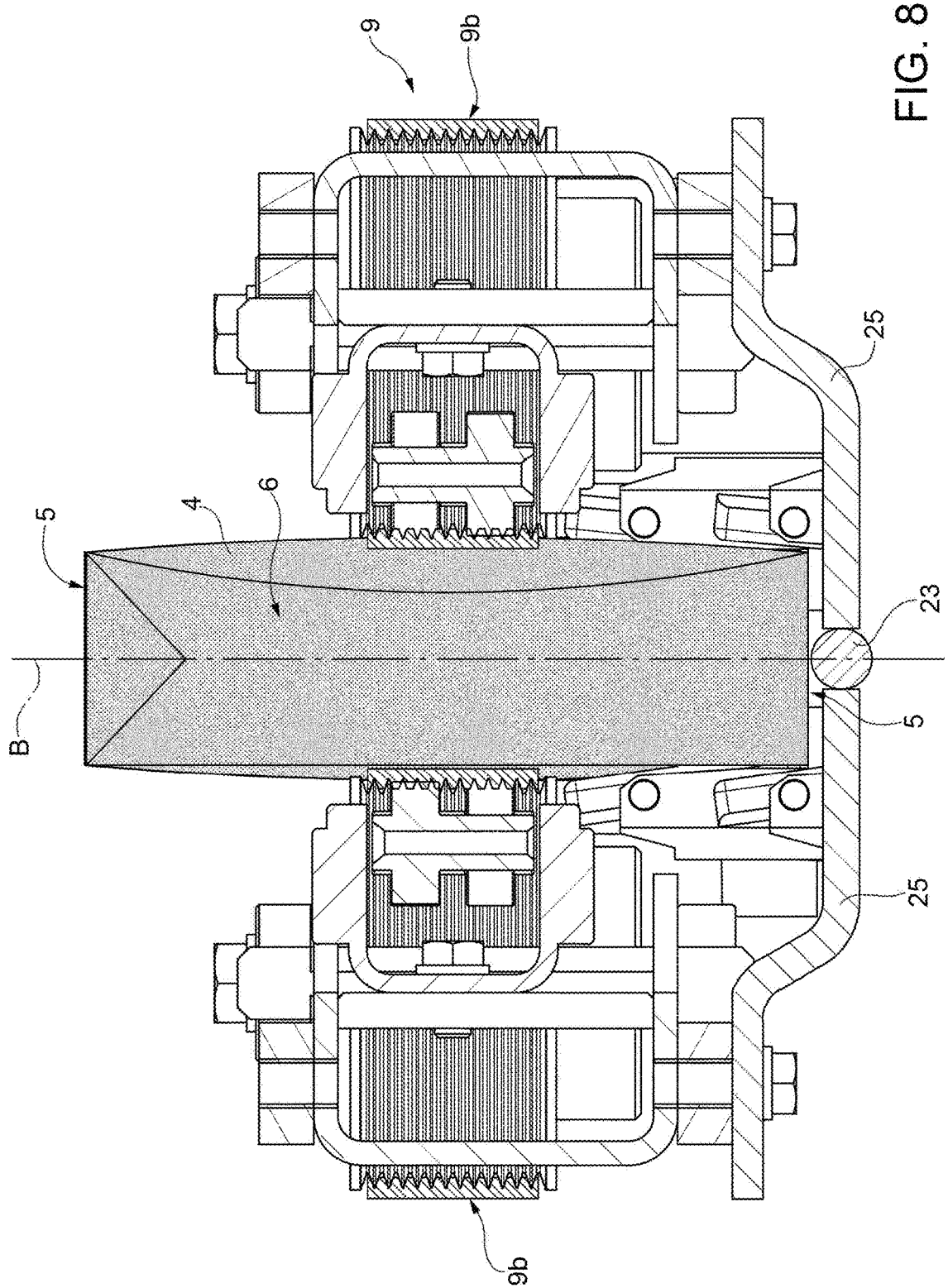
FIG. 8 is a larger-scale section along the line VIII-VIII of FIG. 1, with parts removed for clarity.

After being released to belt unit 9, packages 4 are supported and carried by two opposite endless belts 9b (FIG. 8) facing one another and preferably made of elastomeric material. In particular, belts 9b are configured to cooperate in contact with lateral walls 6 of each package 4.

In this condition, packages 4 are further supported by a linear bar 23, arranged centrally in a position underneath belts 9b and held in place by a plurality of retaining elements 25.

In detail, linear bar 23 is configured to act as a resting element for packages 4, while they are conveyed by belts 9b.

Outfeed device 1 further comprises an endless track defining path P, i.e. extending horizontally along path P. Hence, carts 8 are cyclically movable along track 10.

Since carts 8 are identical to one another, only one single cart 8 according to one non-limiting preferred embodiment of the present invention will be described in the following, for the sake of brevity.

However, all the features disclosed hereinafter for such cart 8 are applicable to each cart 8 of outfeed device 1.

With reference to FIGS. 1 to 7A-7B, cart 8 comprises a main portion 8a, operatively coupled with track 10 so as to be cyclically movable along path P, and a holding portion 7, carried by main portion 8a and carrying, in turn, receiving portion 16.

In particular, holding portion 7 is configured to pick, by means of receiving portion 16, one single package 4 at a time at input station I and for bringing package 4 from input station I to output station O along a direction parallel to at least part of path P.

Figure 6:
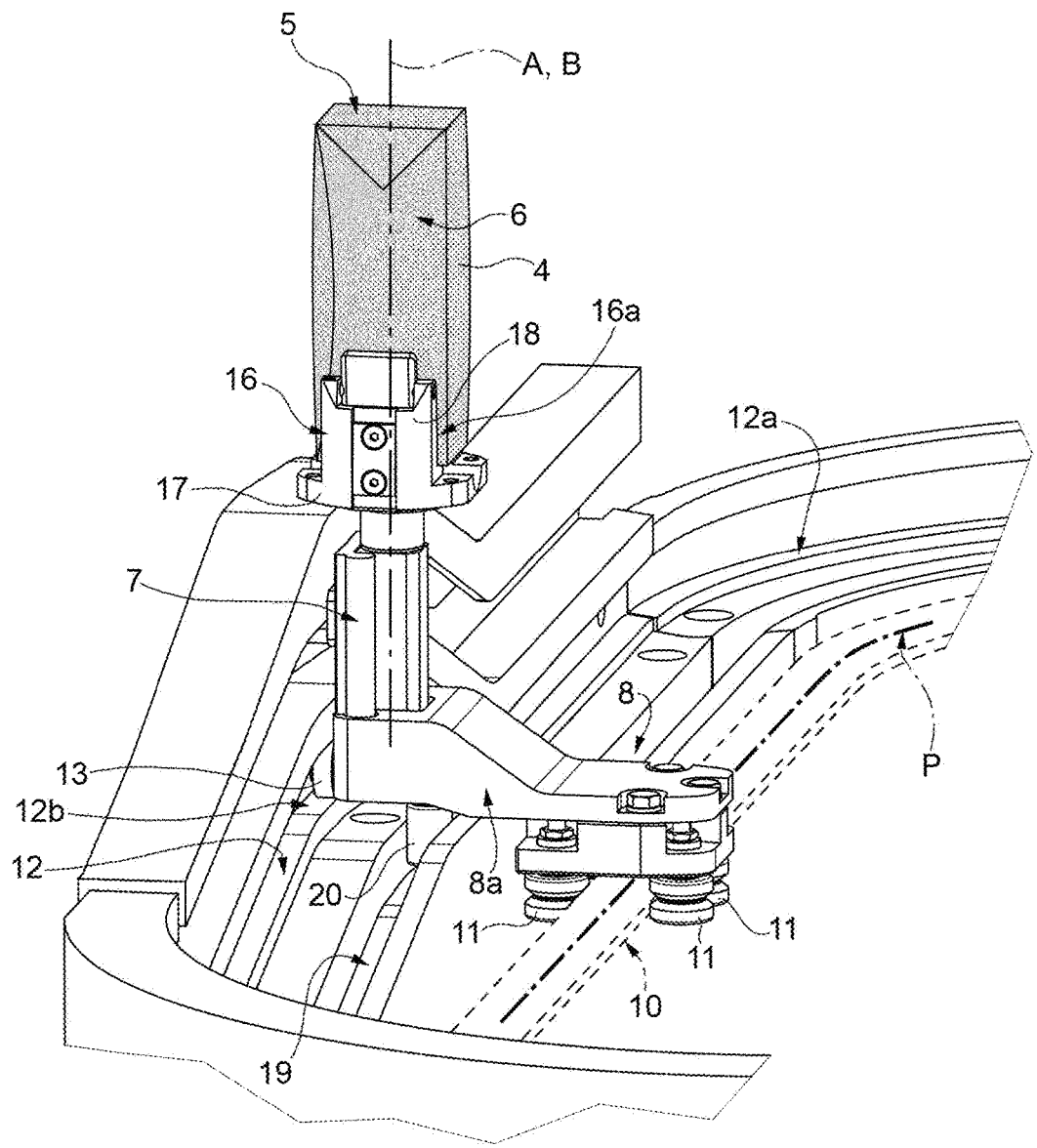
FIG. 6 is a perspective view of the component of FIG. 4 while cooperating with the outfeed device of FIG. 1, with parts removed for clarity.

In detail, cart 8 is provided with a plurality of wheels 11, four in this specific and non-limiting embodiment, configured to cooperate in sliding manner with track 10. In greater detail, wheels 11 are arranged in rows of respective pairs, so that track 10 is received between the wheels 11 of each pair, as shown in FIG. 6.

Preferably, cart 8 is moved by means of an endless conveyor, for example a belt conveyor 24, powered in a known manner not described in detail.

According to this non-limiting preferred embodiment, holding portion 7 is movable with respect to main portion 8a along a relative vertical axis A, preferably orthogonal to path P, between:

an operative position, in which holding portion 7 is extracted from main portion 8a and is moved away from path P for picking or releasing, in use, package 4; and an idle position, in which holding portion 7 is retracted towards main portion 8a.

Outfeed device 1 further comprises actuator means configured to control the movement of holding portion 7 between the idle position and the operative position.

As shown in FIGS. 4 to 7A-7B, the actuator means comprise:

a cam surface 12, fixed with respect to track 10 and extending parallel, at least in part, to path P; and a cam follower 13 carried by holding portion 7 and configured to cooperate with cam surface 12.

Figure 7A:
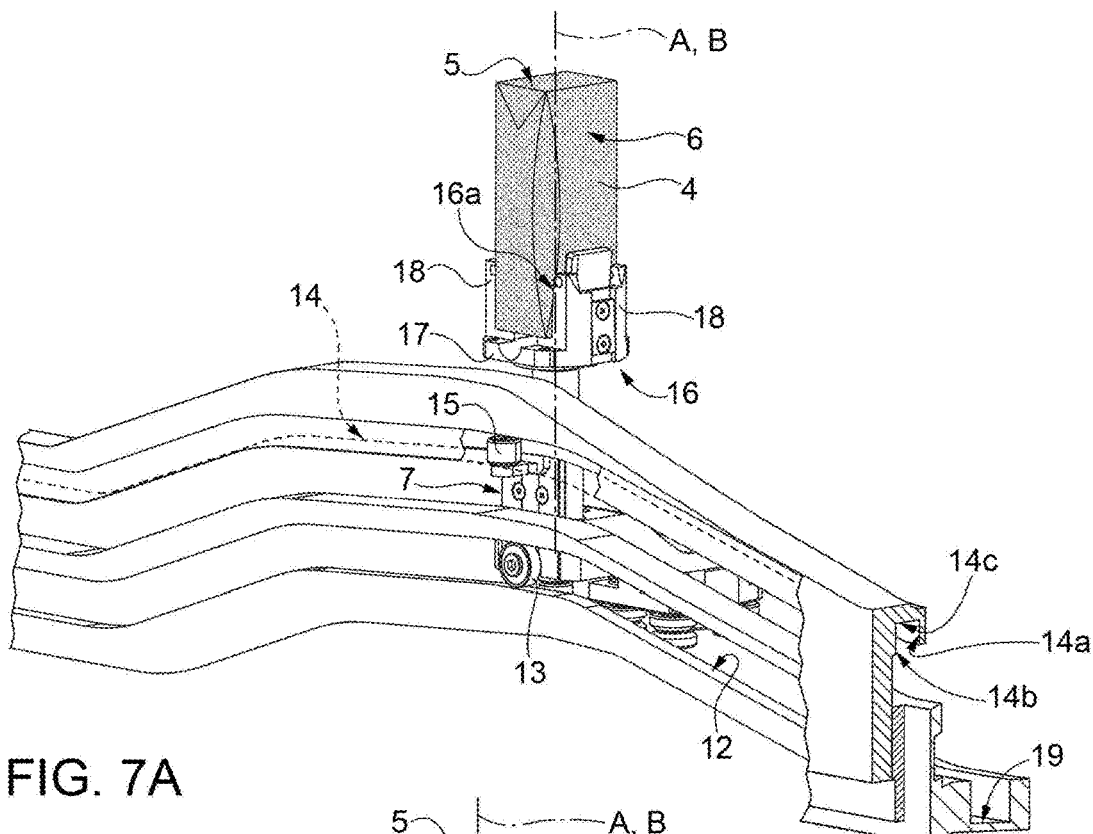
FIG. 7A is another perspective view of the component of FIG. 4 while cooperating with the outfeed device of FIG. 1, with parts removed for clarity.
Figure 7B:
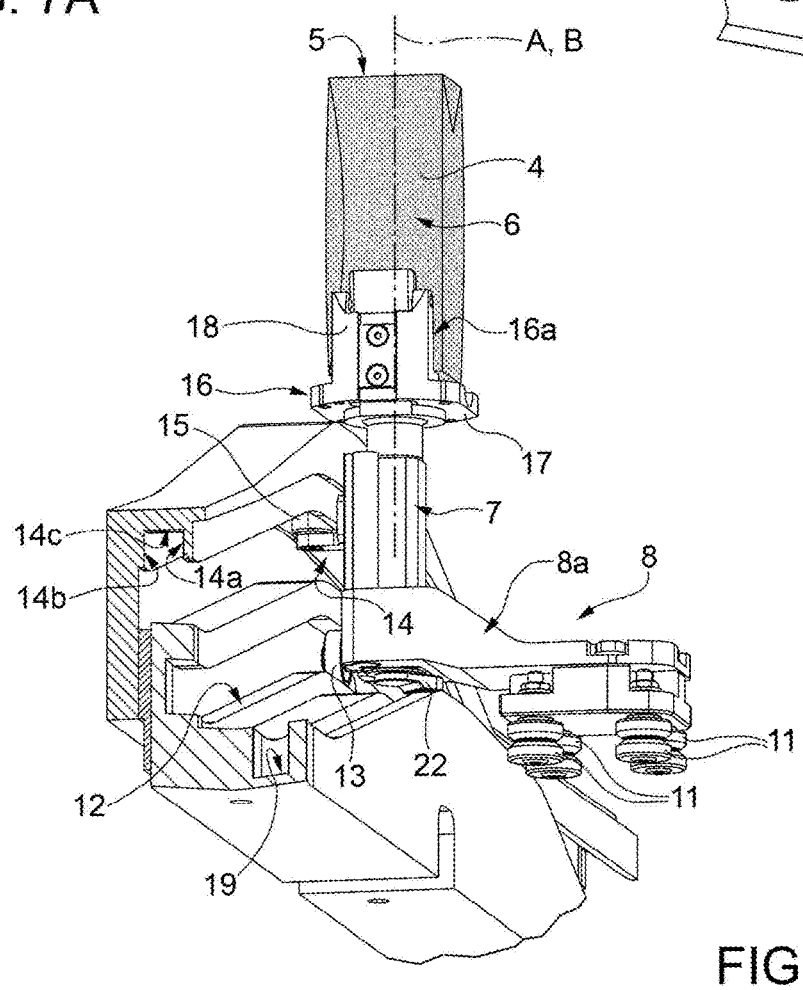
FIG. 7b is a further perspective view of the component of FIG. 4 while cooperating with the outfeed device of FIG. 1, with parts removed for clarity.

In particular, cam surface 12 comprises a main portion 12a, which extends parallel to path P, and two operative portions 12b (only one shown in FIGS. 6 and 7A-7B). In detail, the two operative portions 12b are arranged opposite to one other along corresponding opposite straight branches P1 of path P.

In greater detail, each operative portion 12b has a substantially trapezoidal configuration and has, with respect to the direction of motion of carts 8 along track 10: an ascending ramp, inclined with respect to path P; a flat portion, extending from the ascending ramp and parallel to path P; and a descending ramp, extending from the flat portion and inclined with respect to path P, in particular with an inclination angle opposite to the inclination angle of the ascending ramp.

In light of the above, cam follower 13 is configured to cooperate in contact first with the ascending ramp, then with the flat portion and eventually with the descending ramp of each operative portion 12b. Hence, cam follower 13 is subjected to an up-and-down movement along axis A.

Since cam follower 13 is carried by (mounted on) holding portion 7, this up-and-down movement of cam follower 13 causes the holding portion 7 to move, in particular to slide, axially between the idle position and the operative position, hence towards and away from main portion 8a.

According to this non-limiting preferred embodiment, input station I is located approximately along the flat portion of the operative portion 12b which comes first (first operative portion 12b) with respect to the direction of advancement of cart 8, and output station O is located approximately along the flat portion of the operative portion 12b which comes second (second operative portion 12b) with respect to the direction of advancement of cart 8.

Preferably, outfeed device 1 further comprises a guide mechanism configured to at least limit oscillation of holding portion 7 about axis A when holding portion 7 moves between the idle position and the operative position and/or when holding portion 7 is in the operative position.

As shown in FIGS. 4, 5 and 7A-7b, the guide mechanism comprises:

at least one further track 14 (only one shown in FIGS. 7A and 7B), fixed with respect to track 10, extending parallel, at least in part, to path P and delimited by a first lateral surface 14a and a second lateral surface 14b facing surface 14a; and a cam-follower roller 15, carried by holding portion 7 and configured to cooperate with both surface 14a and surface 14b, so as to at least limit oscillation of holding portion 7 about axis A.

Preferably, track 14 also comprises an upper surface 14c, orthogonal both to surface 14a and to surface 14b and defining, together with these latter, a guiding groove for roller 15.

Hence, track 14 has an inverted U-shaped cross-section.

In particular, outfeed device 1 comprises two tracks 14, each one extending in correspondence of one respective straight branch P1 of path P and arranged above the respective operative portion 12b of cam surface 12 located on the same straight branch P1 of path P.

More specifically, each track 14 has a substantially trapezoidal shape similar to that of such operative portion 12b. Therefore, each track 14 has an ascending ramp, a flat portion and a descending ramp.

In detail, when roller 15 moves between surface 14a, surface 14b and surface 14c, track 14 acts as guiding groove for roller 15. Since roller 15 is carried by (mounted on) holding portion 7, it limits the oscillations of holding portion 7, especially when holding portion 7 is in the operative (hence, extracted) position.

According to this non-limiting preferred embodiment, receiving portion 16 comprises two walls 18 facing one another, delimiting the receiving seat 16a and configured to house at least a portion of package 4. Preferably, walls 18 are configured to house the bottom end portion of package 4.

More specifically, receiving portion 16 further comprises a base surface 17, which defines, in use, an abutment for bottom end wall 5 of package 4, and from which walls 18 protrude.

Preferably, base surface 17 is coaxial to axis A.

As shown in FIGS. 1 to 7A-7B, receiving portion 16 is rotatable with respect to main portion 8a.

More specifically, receiving portion 16 is designed to perform a rotation of a given angle, in particular of 90°, about axis A.

In detail, receiving portion 16 is designed to perform such rotation at least while cart 8 advances, in use, from a point of path P downstream of input station I to a point of path P upstream of output station O, so as to rotate package 4 before package 4 is released to belt unit 9. In particular, package 4 is rotated of 90°.

Receiving portion 16 is also designed to perform a further rotation about axis A, so as to return back to its original position (hence, to perform a rotation of the same given angle, preferably 90°). In detail, such rotation occurs while cart 8 is moving from output station O towards input station I, preferably along the curved branch P2 of path P downstream of output station O.

In this non-limiting preferred embodiment shown, receiving portion 16 is defined by a clamping element, comprising a base plate, defined by base surface 17, and a pair of jaws, defined by walls 18, protruding upwardly from base surface 17.

As shown in FIGS. 4 to 7A-7B, outfeed device 1 further comprises further actuator means configured to selectively control the rotation of receiving portion 16 about axis A.

In particular, the further actuator means comprise:

guiding means, fixed with respect to track 10 and extending parallel to at least part of path P; and at least one further cam-follower roller 20, movably coupled to the guiding means and carried by receiving portion 16 in a position eccentric with respect to axis A.

In detail, the guiding means comprise at least one guide profile 19, whose projection on a horizontal plane containing path P diverges from a portion of path P adjacent to guide profile 19.

More specifically, guide profile 19 diverges horizontally from a direction parallel to the portion of path P adjacent to such guide profile 19.

In greater detail, guide profile 19 is configured to cause a movement of roller 20 towards or away from path P, when roller 20 cooperates with the same guide profile 19.

In practice, when roller 20 cooperates with guide profile 19, it moves horizontally towards or away from path P, due to the divergence of guide profile 19 with respect to path P.

Thanks to the eccentric position of roller 20 with respect to axis A, the horizontal movement of roller 20 causes a rotation of receiving portion 16.

In particular, (FIGS. 4 and 5) roller 20 is carried by receiving portion 16 by means of a lever mechanism.

Preferably, the lever mechanism comprises a linear rod 21 coaxial to axis A and coupled to receiving portion 16, preferably coupled to base surface 17, and a lever member 22. In detail, lever member 22 is fixed to rod 21 at one end and carries, at the opposite end, roller 20.

According to this non-limiting preferred embodiment, outfeed device 1 comprises two guide profiles 19. A first guide profile 19 is arranged downstream of the first curved branch P2 of path P downstream of input station I, with respect to the advancing direction of cart 8 along track 10. A second guide profile 19 is arranged along the curved branch P2 downstream of output station O, with respect to the advancing direction of cart 8 along track 10.

Preferably, outfeed device 1 comprises a plurality of carts 8, each one comprising a respective receiving portion 16 defining a relative receiving seat 16a configured to pick one respective package 4 at a time at input station I and to release it at output station O.

The operation of outfeed device 1 is described hereinafter with reference to a single cart 8 moving along track 10 and advancing a respective holding portion 7, the latter carrying a respective package 4 from input station I to output station O, in particular starting from a condition in which such holding portion 7 is at input station I.

In this condition, receiving seat 16a defined by the receiving portion 16 of holding portion 7 has just received one package 4 from folding unit 3. Furthermore, holding portion 7 is in the operative position. Hence, the respective cam follower 13 is cooperating with the flat portion of the first operative portion 12b of cam surface 12, with respect to the advancement direction of cart 8.

After receiving portion 16 has received (picked) one package 4, holding portion 7 moves towards the idle position, as cam follower 13 cooperates with the descending ramp of the first operative portion 12b.

After holding device 7 is advanced along the first curved branch P2 of path P downstream of input station I, the respective roller 20 starts to cooperate with the first guide profile 19.

At this point, due to the eccentric positioning of roller 20 with respect to rod 21 and due to the horizontal divergence of guide profile 19 with respect to path P, lever mechanism is activated.

In particular, the horizontal movement of roller 20 away from path P causes rod 21 and, thus, receiving portion 16 to rotate about axis A.

Then, cam follower 13 starts to cooperate with the ascending ramp of the second operative portion 12b of cam surface 12, with respect to the advancement direction of cart 8, so that holding portion 7 can move along axis A from the idle position towards the operative position again.

Once holding portion 7 has reached the operative position, receiving portion 16 releases package 4 to belt unit 9, which delivers it to outlet conveyor 9a.

After cart 8 has reached the curved branch P2 of path P downstream of output station O, roller 20 cooperates with the second guide profile 19, the latter causing the rotation of receiving portion 16 back to its original position.

The entire operation is repeated cyclically for every cart 8 present in outfeed device 1 and for every package 4 conveyed from input station I to output station O.

The advantages of outfeed device 1 according to the present invention will be clear from the foregoing description.

In particular, the configuration proposed in the present invention prevents the packages 4 from falling once they reach the outfeed device 1, as they are retained and conveyed one by one by the respective receiving portion 16 of the relative holding portion 7. Therefore, this configuration allows to avoid any unwanted production jamming caused by the falling of packages 4.

Clearly, changes may be made to outfeed device 1 as described herein without, however, departing from the scope of protection as defined in the accompanying claims.

The invention claimed is:

1. An outfeed device for a packaging assembly configured to form and seal a plurality of packages containing a pourable product; said outfeed device comprising:
   an input station, at which said outfeed device receives, in use, said packages;
   an output station, at which said packages exit, in use, from said outfeed device;
   at least one selectively operable cart element cyclically movable along an endless path, the at least one selectively operable cart element comprising a receiving portion defining a receiving seat for picking one single package at a time at said input station, housing at least part of said package, and being configured to bring said package from said input station to said output station, the receiving portion comprising a base surface and upstanding wall portions projecting from the base surface, the upstanding wall portions being spaced apart from one another so that the one single package at a time is positioned between the wall portions, the upstanding wall portions being positioned to contact opposite sides of said package to prevent said package from falling as said package is moved from said input station to said output station.

2. The device as claimed in claim 1, and further comprising an endless track defining said path; said cart element comprising a main portion, operatively coupled with said track so as to be cyclically movable along said path, and a holding portion, carried by said main portion and carrying, in turn, said receiving portion.

3. The device as claimed in claim 2, wherein said holding portion, together with said wall portions and said base surface, is movable with respect to said main portion along a relative axis transversal to said path between:
   an operative position, in which said holding portion is extracted from said main portion and is moved away from said path for picking or releasing, in use, said package; and
   an idle position, in which said holding portion is retracted towards said main portion.

4. The device as claimed in claim 3, and further comprising actuator means configured to control the movement of said holding portion between said idle position and said operative position.

5. The device as claimed in claim 4, wherein said actuator means comprise a cam surface, fixed with respect to said track, and at least one cam follower carried by said holding portion and configured to cooperate with said cam surface; said cam surface comprising at least one main portion extending parallel to said path, and at least one operative portion having an ascending ramp inclined with respect to said path, a flat portion extending from said ascending ramp and parallel to said path, and a descending ramp, extending from said flat portion and inclined with respect to said path.

6. The device as claimed in claim 3, and further comprising a guide mechanism configured to at least limit oscillation of said holding portion about said axis when said holding portion moves between said idle position and said operative position and/or when said holding portion is in said operative position.

7. The device as claimed in claim 6, wherein said guide mechanism comprises:
at least one further track delimited by a first surface and a second surface facing said first surface; and
at least one cam-follower roller carried by said holding portion and configured to cooperate with both said first surface and said second surface, so as to at least limit oscillation of said holding portion about said axis.

8. The device as claimed in claim 7, wherein said further track further comprises a third surface, transversal to both said first surface and said second surface and defining, together with said first surface and said second surface, a guiding groove for said cam-follower roller.

9. The device as claimed in claim 3, wherein said wall portions comprise two spaced-apart walls facing one another, delimiting said receiving seat and configured to house at least a portion of said package.

10. The device as claimed in claim 9, wherein said receiving portion is rotatable with respect to said main portion; said outfeed device further comprising further actuator means configured to selectively control a rotation, of a given angle, of said receiving portion about said axis.

11. The device as claimed in claim 10, wherein said receiving portion is configured to perform said rotation at least while said cart element advances, in use, from a point of said path downstream of said input station to a point of said path upstream of said output station, so as to release said package at said output station rotated of said given angle.

12. The device as claimed in claim 10, wherein said further actuator means comprise guiding means, fixed with respect to said track, and at least one further cam-follower roller, movably coupled to said guiding means and carried by said receiving portion in a position eccentric with respect to said axis.

13. The device as claimed in claim 12, wherein said guiding means comprise at least one guide profile, whose projection on a plane containing said path diverges from a portion of said path adjacent to said guide profile, so as to produce a movement of said further cam-follower roller towards or away from said path.

14. The device as claimed in claim 1, wherein the wall portions comprise separate walls that each include side surfaces extending upwardly to an upper surface of the wall.

15. The device as claimed in claim 1, and comprising a plurality of said cart elements, each one comprising a respective receiving portion defining a relative receiving seat configured to pick one respective package at a time at said input station.

16. A packaging assembly configured to form and seal a plurality of packages containing a pourable product; said packaging assembly comprising a folding unit configured for receiving a plurality of semi-formed pillow packs and for transforming said pillow packs in said packages;
said packaging assembly further comprising an outfeed device according to claim 1;
said outfeed device being configured to receive said packages from said folding device at an input station (I) and to release said packages to an outlet conveyor at an output station.

17. An outfeed device for a packaging assembly that is configured to form and seal a plurality of packages containing a pourable product, the outfeed device comprising:
an input station at which the outfeed device receives the packages;
an output station at which the packages exit the outfeed device;
a plurality of selectively operable carts each cyclically movable along an endless path, each of the carts comprising a base surface and a pair of upstanding walls projecting from the base surface, the base surface and the upstanding walls defining a receiving seat configured to receive one single package at a time, to house at least part of the package and to bring the package from the input station to the output station, the upstanding walls being positioned to contact opposite sides of the package when the package is positioned in the receiving seat to prevent the package in the receiving seat from falling as the package in the receiving seat is moved from the input station to the output station; and
a belt conveyor operatively connected to each of the carts to move each of the carts along the endless path.

18. The device as claimed in claim 17, wherein each cart also comprises a main portion and a holding portion, the holding portion carrying the base surface and the wall portion, the holding portion being carried by the main portion in a manner allowing the holding portion, together with the base surface and the wall portion to move relative to the main portion in a vertical direction that is orthogonal to the endless path.

19. An outfeed device for a packaging assembly that is configured to form and seal a plurality of packages containing a pourable product, the outfeed device comprising:
an input station at which the outfeed device receives the packages;
an output station at which the packages exit the outfeed device; and
a plurality of selectively operable carts that are separate from one another and that are cyclically movable along an endless path, each of the carts comprising a receiving portion defining a receiving seat for picking one single package at a time at said input station, housing at least part of said package, and being configured to bring said package from said input station to said output station;
the receiving portion of each cart being rotatable about a rotation axis; and
the receiving portion of each cart including a cam-follower roller that is carried by the respective receiving portion so that the cam-follower roller moves together with the respective receiving portion, the cam-follower roller of each receiving portion being eccentric with respect to the rotation axis of the respective receiving portion, the cam-follower roller of each receiving portion being engageable with a guide profile during a portion of the movement of the respective receiving portion from said input station to said output station to cause rotation of both the respective receiving portion and the package housed in the respective receiving portion.

20. The device as claimed in claim 19, wherein each cart comprises a base surface and upstanding wall portions that project upwardly away from the base surface, the base surface and the wall portion defining the receiving seat that is configured to receive the one single package at a time so that inner surfaces of the wall portions face outer surfaces of the package.

21. An outfeed device for a packaging assembly configured to form and seal a plurality of packages containing a pourable product;

said outfeed device comprising an input station, at which said outfeed device receives, in use, said packages, and an output station, at which said packages exit, in use, from said outfeed device;

at least one selectively operable cart element cyclically movable along an endless path, comprising a receiving portion defining a receiving seat for picking one single package at a time at said input station, housing at least part of said package, and being configured to bring said package from said input station to said output station; and by further comprising an endless track defining said endless path; said cart element comprising a main portion, operatively coupled with said track so as to be cyclically movable along said endless path, and a holding portion, carried by said main portion and carrying, in turn, said receiving portion, wherein said holding portion is movable with respect to said main portion along a relative axis transversal to said endless path between:

an operative position, in which said holding portion is extracted from said main portion and is moved away from said path for picking or releasing, in use, said package; and an idle position, in which said holding portion is retracted towards said main portion.

* * * * *